United States Patent
Liu et al.

(10) Patent No.: US 11,333,759 B2
(45) Date of Patent: May 17, 2022

(54) EMBEDDED PROCESSOR-BASED THREE-DIMENSIONAL ACOUSTIC IMAGING REAL-TIME SIGNAL PROCESSING DEVICE

(71) Applicant: ZHEJIANG UNIVERSITY, Hangzhou (CN)

(72) Inventors: Xuesong Liu, Hangzhou (CN); Fan Zhou, Hangzhou (CN); Dongdong Zhao, Hangzhou (CN); Yaowu Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 735 days.

(21) Appl. No.: 16/308,401

(22) PCT Filed: Feb. 12, 2018

(86) PCT No.: PCT/CN2018/076392
§ 371 (c)(1),
(2) Date: Dec. 7, 2018

(87) PCT Pub. No.: WO2018/157736
PCT Pub. Date: Sep. 7, 2018

(65) Prior Publication Data
US 2019/0196014 A1    Jun. 27, 2019

(30) Foreign Application Priority Data
Mar. 1, 2017    (CN) .......................... 201710118201.5

(51) Int. Cl.
*G01S 15/89* (2006.01)
*G06T 1/20* (2006.01)
*G01S 7/62* (2006.01)

(52) U.S. Cl.
CPC ........ *G01S 15/8993* (2013.01); *G01S 7/6245* (2013.01); *G01S 15/89* (2013.01); *G01S 15/8929* (2013.01); *G06T 1/20* (2013.01)

(58) Field of Classification Search
None
See application file for complete search history.

(56) References Cited

U.S. PATENT DOCUMENTS

2013/0022222 A1* 1/2013 Zschau ................ G03H 1/2294
                                                                 381/306
2016/0317123 A1* 11/2016 Kinnon Dahlgren .. A61B 8/462

FOREIGN PATENT DOCUMENTS

CN        102918466        2/2013

OTHER PUBLICATIONS

Yin, Mingming et al., "Study on 3D Image Sonar Based on GPU", Technical Acoustics, 33(5), Oct. 31, 2-14, pp. 54-56.

* cited by examiner

*Primary Examiner* — Hovhannes Baghdasaryan
(74) *Attorney, Agent, or Firm* — Jiwen Chen; Jacobson Holman PLLC

(57) ABSTRACT

The present invention had disclosed an embedded processor based 3D acoustic imaging real-time signal processing device of modularized design; the system comprises an embedded GPU signal processing subsystem, a signal interaction subsystem and a signal acquisition subsystem. The system takes Tegra K1 embedded GPU processor as the core; Tegra K1 embedded GPU processor is provided with features of OpenGL4.4, OpenGL ES 3.1 and CUDA, which has high parallel image processing capability and abundant high-speed data interconnection interface; it is especially applicable to high-speed data transmission and effective calculation of image algorithm for 3D acoustic imaging real-time signal processing device. Meanwhile, it can realize (Continued)

high-speed data interaction between signal processing subsystem and numerous signal acquisition subsystems; the whole system has powerful data interaction capability and real-time parallel processing capability.

1 Claim, 4 Drawing Sheets

EMBEDDED PROCESSOR-BASED THREE-DIMENSIONAL ACOUSTIC IMAGING REAL-TIME SIGNAL PROCESSING DEVICE

This is a U.S. national stage application of PCT Application No. PCT/CN2018/076392 under 35 U.S.C. 371, filed Feb. 12, 2018 in Chinese, claiming priority of Chinese Application No. 201710118201.5, filed Mar. 1, 2017, all of which are hereby incorporated by reference.

FIELD OF THE INVENTION

The present invention is related to 3D acoustic imaging processing field, in particular to an embedded processor based 3D real-time acoustic imaging signal processing device.

BACKGROUND ARTS

As one of important innovations in underwater application field in recent years, 3D acoustic imaging of phased array has such advantages as high resolution, excellent real-time performance as well as 3D information on observable objects and moving objects identification, which plays an increasingly important role in such underwater application fields as underwater biology, physics, archaeology, geology and military science; it is currently a hot spot for study. Governments, institutions and scholars have carried out relevant studies on 3D acoustic imaging system of phased array. In 2004, University of Verona, University of Florence, University of Genova and University of Milan carried out low-cost study on 3D imaging and modeling automation system under the sponsorship of Italy Government. A3US Laboratory headed by Professor A. Trucco from University of Genova, Italy, carried out a profound study on sparse array design, real-time wave beam formation and image processing algorithm of 3D acoustic imaging system of phased array. However, only CodaOctopus Company, UK has successfully developed a 3D imaging acoustic imaging product of phased array; technologies on real-time signal processing for 3D Acoustic imaging of phased array has always been monopolized by developed countries in EU. In China, the first 3D acoustic imaging system in China as jointly developed by No. 715 Research Institute of CSIC and Institute of Digital Technologies and Instrumentation of Zhejiang University has filled in domestic gap in this field. The system was equipped with a 48×48 2D planar receiving transducer array with detection distance, angular resolution and range resolution up to 200 m, 0.4° and 2 cm, respectively. The team headed by Professor Fang En SANG from Harbin Institute of Technology has developed a 3D sonar imaging system with the help of underwater robot based on 16×8 2D planar array.

Despite of the fact that certain progress in relevant studies of 3D acoustic imaging system of phased array has been made so far, the following difficult problems are still to be settled to satisfy engineering applications: 1) Real-time 3D acoustic imaging algorithm is in need of enormous calculation of digital signal processing, which is difficult for real-time calculation; 2) it is in need of development of small super-speed embedded parallel real-time calculation system of low power consumption as well as effective restructuring, identification and analysis of 3D images; 3) the acoustic receiving array of the system comprises several thousand energy transducers, which requires enormous original sampling data.

Tegra K1 embedded GPU processor as launched by Nvidia has GPU of Kepler Architecture with 192 cores that is specially designed for execution of complicated geometrical and numerical calculation. It has powerful 3D image acceleration function and floating point calculation performance that is superior to CPU by several dozens or even more than hundred times. With regard to 3D image processing, Tegra K1 embedded GPU can support OpenGL4.4 and OpenGL ES 3.1, the two 3D graphic program interfaces as widely accepted in the industry, which can effectively realize 3D image processing and display through acceleration of hardware. With regard to numerical calculation, Tegra K1 embedded GPU has 192 CUDA (Compute Unified Device Architecture) cores and optimal 325GFLOPS floating point calculation performance. It is especially applicable to calculation of intensive data and large-scale parallel data. Meanwhile, Tegra K1 embedded GPU makes use of optimized Kepler architecture to monitor various power sources via PMU (Power Management Unit) to improve power efficiency, and effectively reduce power consumption.

Sparse array sampling refers to sampling of channel at interested array element positions only, which can solve such problems as high bandwidth, enormous calculation and high consumption of sampling data as brought forth by full energy transducer array. Corresponding weight coefficient is to be multiplied to inhibit side-lobe peak value following sparse sampling of array.

The Field Programmable Gate Array (FPGA) features in abundant I/O pins, precise time sequence control and flexible pin definition. Triggered by synchronous signals, it can realize synchronous sampling of large-scale array by multi FPGA; FPGA pins are defined as multi LVDS interfaces as required to realize interconnection of one main FPGA with multi subsidiary FPGAs via LVDS interface to ensure synchronous high-speed data transmission from multi subsidiary FPGA to main FPGA.

SUMMARY OF THE INVENTION

In view of the above, the present invention provides an embedded processor based 3D acoustic imaging real-time processing device; the device can effectively solve such problems as high bandwidth of sampling data, unavailable real-time calculation by 3D acoustic imaging algorithm, and development of small system of low power consumption.

An embedded processor based 3D acoustic imaging real-time processing device, comprising numerous signal acquisition subsystems, signal interaction subsystems and embedded GPU signal processing subsystems; the signal acquisition system aims to collect and receive signal data from any channel in the acoustic array according to commands from embedded GPU signal processing subsystem for preprocessing, and then send preprocessing data to embedded GPU signal processing subsystem via the signal interaction subsystem; the embedded GPU signal processing subsystem aims to process preprocessing data as received to obtain image data.

The signal acquisition subsystem comprises:

a command interface, used to receive command from embedded GPU signal processing subsystem, and send it to FPGA chip;

a FPGA chip, used to control opening or closure of any channel in the transducer array by the programmable switch according to the command received, receive preprocessing data among processed signal data from some channels in the transducer array, control programmable amplification chip according to preprocessing data to realize real-time gain control, and send preprocessing data to LVDS interface;

a programmable switch, used to control opening or closure of any channel in the transducer array to realize sparsification of 3D acoustic imaging transducer array;

an amplifying filter chip, used to receive and collect analog signals for amplification and filtering;

a programmable amplifying chip, used for real-time gain and amplification of analog signal data as received according to control signals from the FPGA chip;

an AD chip, used to convert analog signals as processed into digital signal data to obtain preprocessing data, and send it to the FPGA chip;

an LVDS, used to send preprocessing data in the FPGA chip to signal interaction subsystem.

Aforesaid signal acquisition subsystem can realize synchronous sampling, amplification and filtering of multichannel acoustic signals, real-time TVG (Time Varied Gain) control, preprocessing and data transmission.

The signal interaction subsystem comprises:

a command interface, used to receive commands from embedded GPU signal processing subsystem, and send them to the FPGA chip;

multi LVDS, used for the FPGA chip for synchronous receiving of preprocessing data from numerous signal acquisition subsystems;

an FPGA chip, used to control the multi LVDS interfaces for receiving of preprocessing data as well as synchronous buffering, sorting and packing of preprocessing data according to commands from signal acquisition subsystem; furthermore, it aims to transmit preprocessing data to PCIe bus according to commands from embedded GPU signal processing system;

a PCIe bus, used to send preprocessing data as received by the FPGA chip to the embedded GPU signal processing system.

Aforesaid signal interaction subsystem can realize high bandwidth and command control for multi signal acquisition subsystems and signal processing subsystems for synchronous receiving of preprocessing data from signal acquisition subsystem by signal processing subsystem.

The embedded GPU signal processing subsystem comprises:

a command interface, used to receive commands from embedded GPU signal processing subsystem, and send them to signal interaction subsystem and signal acquisition subsystem;

a PCIe bus, used to receive preprocessing data from signal interaction subsystem, and send it to Tegra K1 embedded GPU processor; the PCIe bus can realize the maximum data transmission rate of 20 Gbps to satisfy transmission bandwidth for 3D sonar preprocessing data;

a Tegra K1 embedded GPU processor, used to control data received by PCIe bus, and calculate preprocessing data as received to obtain image data, and control remote transmission of image data by Gigabit Ethernet chip, optical fiber transceiver as well as display of image data via DSI display interface;

a transmission interface, used to control transmission of sonic wave in certain time sequence;

a Gigabit Ethernet chip and Gigabit Ethernet interface, used to realize remote transmission of image data;

a Gigabit transceiver chip and port, used to realize remote transmission of image data via the optical fiber;

a DSI display interface, used to transmit image data to the display screen for display of 3D data;

a debugging interface, used to receive external command for debugging of embedded GPU signal processing subsystem.

Aforesaid embedded GPU signal processing subsystem aims to complete receiving of preprocessing data, real-time calculation of 3D sonar image algorithm as well as transmission of image data and command control.

The Tegra K1 embedded GPU processor is provided with features of OpenGL4.4, OpenGL ES 3.1 and CUDA, which has high parallel image processing capability that can realize real-time processing of 3D sonar image algorithm; abundant high-speed data interconnection interface can realize throughput of enormous data on large-scale acoustic signals, optimize GPU of Kepler architecture to realize low power consumption, and eventually realize transmission of 3D acoustic imaging high-speed data and efficient calculation of image algorithm by Tegra K1 embedded GPU processor at low power consumption.

The present invention takes Tegra K1 embedded GPU processor as core design embedded platform to establish the embedded GPU signal processing subsystem based on high 3D image processing performance, high parallel calculation capability, abundant high-speed interaction interfaces and low power consumption of Tegra K1 embedded GPU as well as abundant pins and precise time sequence control of FPGA. Meanwhile, it can realize high-speed interconnection of data between embedded GPU signal processing subsystem and numerous signal acquisition subsystems, and complete synchronous receiving of preprocessing data from multi signal acquisition subsystems by signal processing subsystem. The whole device is provided with powerful data interaction capability and real-time signal parallel processing capability.

PREFERRED EMBODIMENTS OF THE INVENTION

To further describe the present invention in details, technical solutions of the present invention are described in details as follows in combination with FIGS. 1-4 and preferred embodiments.

Figure 1:
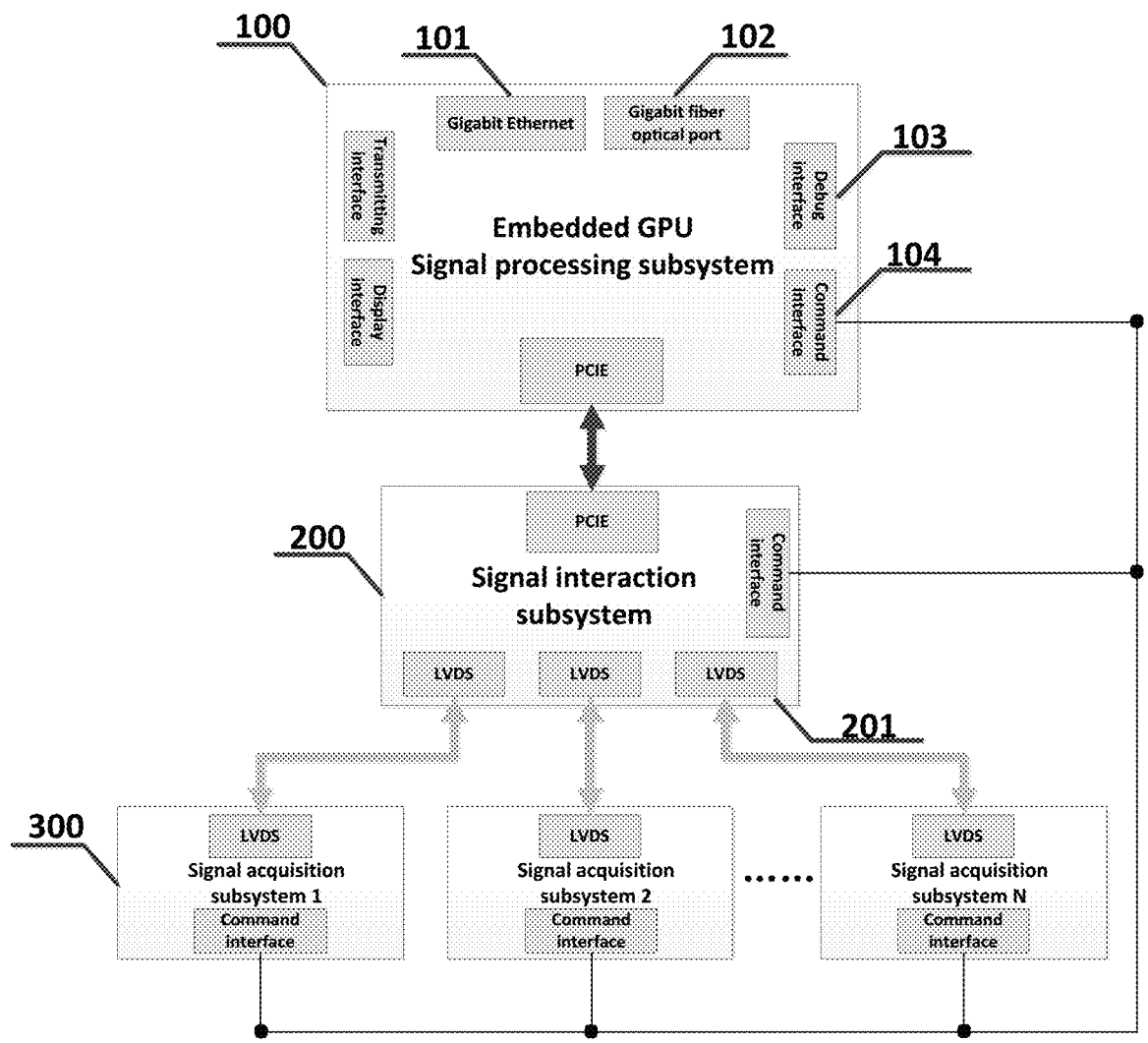
FIG. 1 is the structural diagram of the 3D acoustic imaging real-time signal processing device as disclosed by embodiments of the present invention.

FIG. 1 is the structural diagram for the embedded processor based 3D acoustic imaging real-time signal processing device as disclosed by the embodiment. The device specifically comprises an embedded GPU signal processing subsystem 100, a signal interaction subsystem 200 and a signal acquisition subsystem 300. Wherein, the embedded GPU signal processing subsystem 100 comprises a Gigabit Ethernet interface 101 and a Gigabit fiber optical port 102; it is applicable to use any interface for remote transmission of image data according to practical working environment; the debugging interface 103 aims to receive external command for debugging of embedded GPU signal processing subsystem 100; the embedded GPU signal processing subsystem 100 is interconnected with the signal interaction subsystem via the PCIe bus; the signal interaction subsystem 200 is interconnected with numerous signal acquisition subsystems 300 via numerous LVDS 201 to realize synchronous transmission of preprocessing data from numerous signal acquisition subsystems to the embedded GPU signal processing subsystem 100 via the signal interaction subsystem. The embedded GPU signal processing subsystem 100 is interacted with the signal acquisition subsystem by commands via the command interface 104 and signal interaction subsystem 200 to realize synchronous sampling, real-time gain control, array sparse sampling control and code updating for numerous signal acquisition subsystems 300.

The device according to the present invention can be configured with signal acquisition subsystems 300 in varied quantity according to demands for system algorithm and calculation model; meanwhile, the embedded GPU signal processing subsystem 100 can control opening or closure of any sampling channel in the signal acquisition subsystem 300 through the command interface, which features in flexible system construction and dynamic configuration of sampling channel.

Figure 2:
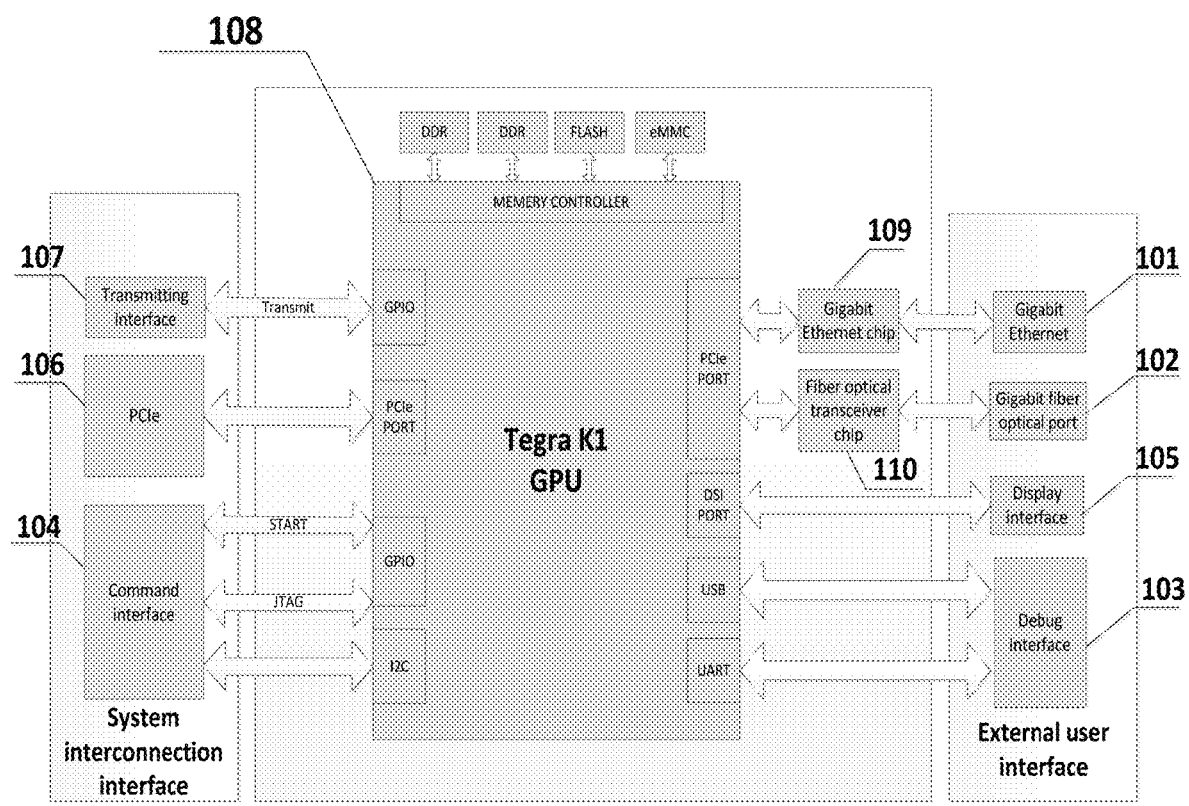
FIG. 2 is the structural diagram for the embedded GPU signal processing subsystem as disclosed by embodiments of the present invention.

FIG. 2 is the structural diagram for the embedded GPU signal processing subsystem as disclosed in the embodiment; the subsystem comprises a Tegra K1 embedded GPU processor 108, a transmission interface 107, a PCIe bus interface 106, a DSI display interface 105, a command interface 104, a debugging interface 103, a Gigabit fiber optical port 102 and a Gigabit Ethernet interface 101. Wherein, a Gigabit Ethernet 109 is connected between the Gigabit Ethernet interface 101 and the Tegra K1 embedded GPU processor 108; an optical fiber transceiver chip 110 is connected between the Gigabit fiber optical port 102 and the Tegra K1 embedded GPU processor 108. The transmission interface 107 aims to control the sonic wave for transmission as per certain time sequence; START signal from command interface 104 controls synchronous sampling of signal acquisition subsystem. Tegra K1 embedded GPU processor 108 aims to receive preprocessing data via the PCIe bus 106 to realize real-time calculation of 3D sonar image algorithm, real-time display of image data via the DSI display interface or remote transmission of image data to the Gigabit fiber optical port 102 via the optical fiber transceiver chip 110; the image data is to be transmitted to upper monitor for display.

Figure 3:
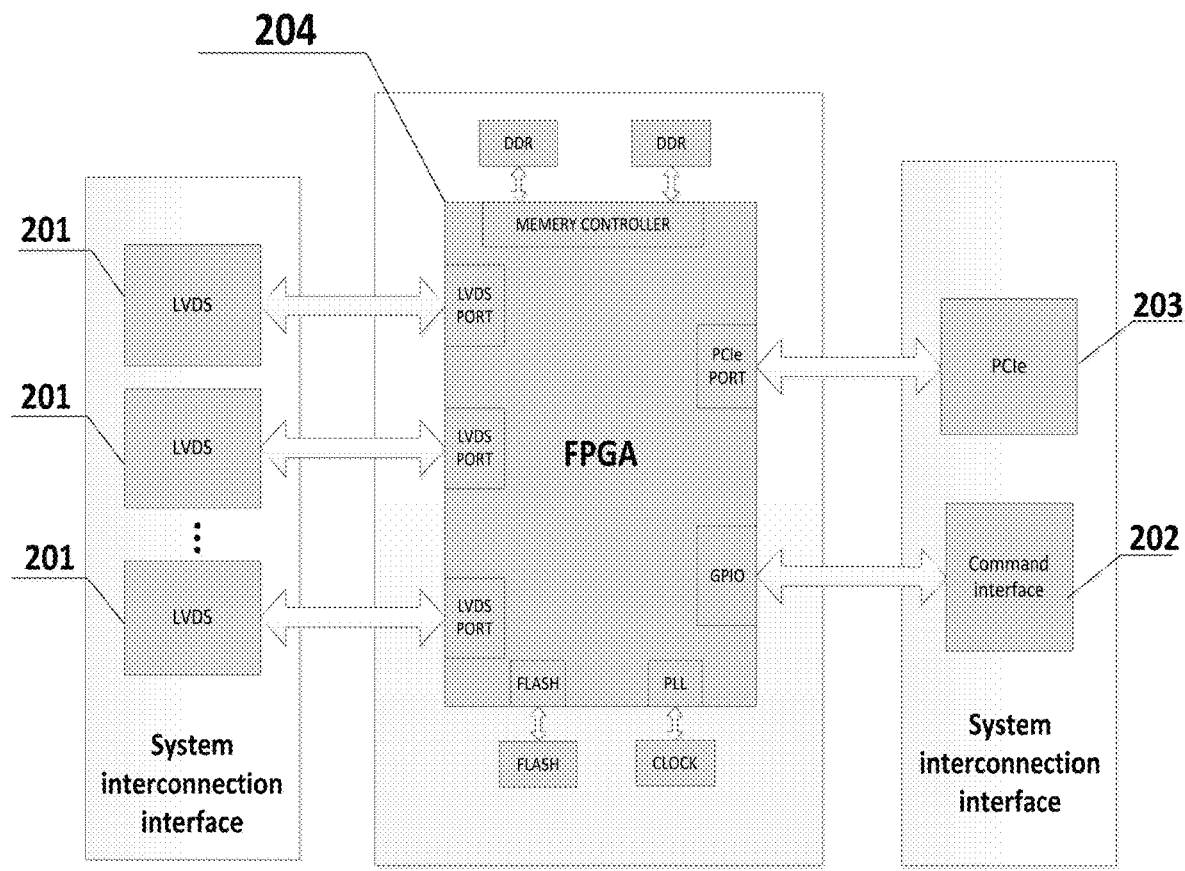
FIG. 3 is the structural diagram for the signal interaction subsystem as disclosed by embodiments of the present invention.

FIG. 3 is the structural diagram for the signal interaction subsystem 200; the subsystem comprises a FPGA chip 204, a PCIe bus 203, a command interface 202 and multi LVDS interfaces 201. Wherein, multi LVDS interfaces 201 are used for synchronous receiving of preprocessing data from multi signal acquisition subsystems 300; the FPGA chip 204 is used for synchronous buffering, sorting and packing of multi preprocessing data per frame before transmitting it to the embedded GPU signal processing system 100 via the PCIe bus 203 to realize high-speed data interaction and synchronous data transmission between multi signal acquisition subsystems 300 and the embedded GPU signal processing subsystem 100.

Figure 4:
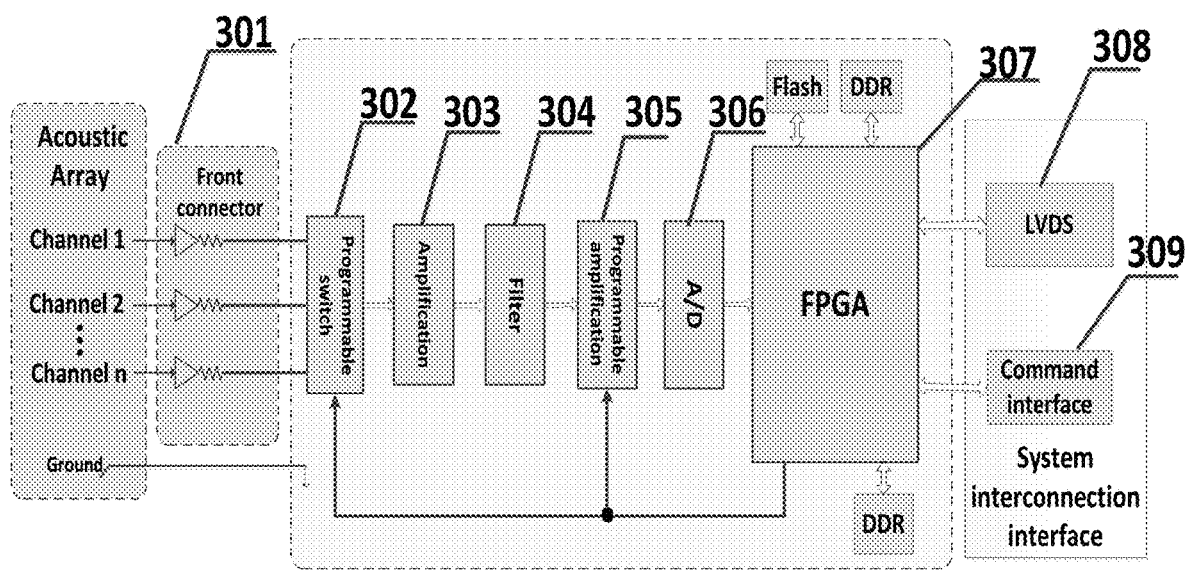
FIG. 4 is the structural diagram for the signal acquisition subsystem as disclosed by embodiments of the present invention.

FIG. 4 is the structural diagram for the signal acquisition subsystem 300 as disclosed by the embodiment; the system comprises a FPGA chip 307, a highly integrated AD chip 306, a programmable amplifier 305, a filter 304, an amplifier 303, a programmable switch 302, a front connector 301, a LVDS interface 308 and a command interface 309. Wherein, FPGA chip 307 is used for command interaction with embedded GPU signal processing subsystem 100 via the command interface 309 to control the programmable switch 302 for opening or closure of any channel in the front connector 301 so as to realize array sparse sampling; meanwhile, FPGA chip 307 controls the programmable amplifier 305 to realize real-time gain control of signals; filter 304 and amplifier 303 are expected to complete signal amplification and filtering; the highly integrated AD chip 306 aims to complete analog-to-digital conversion (ADC) of signals from multi channels. LVDS interface 308 aims to send processed data to signal interaction subsystem 200.

Work process of the embedded processor based 3D acoustic imaging real-time signal processing device as disclosed by the embodiment is stated as follows:

(1) Configuration of sparse parameters and TVG parameters: The embedded GPU signal processing subsystem 100 configures array sparse sampling parameters and TVG parameters to the FPGA chip 307 in the signal acquisition subsystem 300 via the command interface 104; after that, the FPGA chip 307 controls the programmable switch 302 to realize array sparse sampling; the FPGA chip 307 controls programmable amplifier 306 to realize TVG control.

(2) Transmission signal: The embedded GPU signal processing subsystem 100 controls the transmission interface 107 to transmit sonic wave as per certain time sequence, and sends synchronous sampling command to multi signal acquisition subsystems 300 via the START signal from the command interface 104 once the echo reaches the system to realize synchronous sampling control.

(3) Data acquisition and preprocessing: The signal acquisition subsystem 300 controls the operation of the programmable switch 302, the amplifier 303, the filter 304, the programmable amplifier 305 and the AD chip 306 for amplification, filtering and AD conversion of acoustic echo signals as collected after receiving of START signal; the programmable switch 302 and the programmable amplifier 305 aim to realize array sparse sampling and TVG functions; the FPGA chip 307 proceeds with preprocessing of sampling data, such as weight coefficient multiplication, Fourier transform and so on before transmitting the preprocessing data to the signal interaction subsystem 200 via the LVDS interface 308.

(4) Data receiving and transmission: the signal interaction subsystem 200 aims at synchronous receiving preprocessing data from multi signal acquisition subsystems 300; the FPGA chip 204 aims at buffering, sorting and packing of multi preprocessing data per frame, and transmit it to embedded GPU signal processing subsystem 100 via the PCIe bus 203 to realize high-speed data interaction and synchronous data transmission between multi signal acquisition subsystems 300 and embedded GPU signal processing subsystems 100.

(5) Data receiving, processing, display and display as well as control of next transmission: Embedded GPU signal processing subsystem 100 makes use of the PCIe bus 106 to receive preprocessing data transmitted by the signal interaction subsystem 200; the Tegra K1 embedded GPU processor 108 aims to realize real-time calculation of 3D sonar image algorithm for real-time display of image data via the DSI display interface 105 or remote transmission of the same via the optical transceiver chip 110 and Gigabit fiber optical port 102; image data is to be transmitted to the upper monitor for display.

Aforesaid preferred embodiments aim to provide detailed description of technical solutions and beneficial effects of the present invention; it should be understood that what mentioned above are the most preferred embodiments of the present invention, which are not used to restrict the present invention; any alteration, supplement and equivalent substitution as made according to principles of the present invention is to be under the protection of the present invention.

The invention claimed is:

1. An embedded processor based 3D real-time acoustic imaging signal processing device, comprising:
   a signal acquisition system with a plurality of signal acquisition subsystems,
   at least one signal interaction subsystem, and
   at least one embedded GPU signal processing subsystem;
   wherein the signal acquisition system collects and receives signal data from any channel in the acoustic array according to command from embedded GPU signal processing subsystem, and proceed with preliminary processing of signal data before sending the data as preliminarily processed to the embedded GPU signal processing subsystem via the signal interaction subsystem; the embedded GPU signal processing subsystem processes preliminarily processed data as received to obtain image data;
   wherein each of the signal acquisition subsystems comprises:
   a command interface for the signal acquisition subsystem, used to receive command from embedded GPU signal processing subsystem, and send the commend to a first FPGA chip;
   the first FPGA chip, used to control opening or closure of any channel in the transducer array by the programmable switch according to the command received, receive preprocessing data among processed signal data from some channels in the transducer array, control programmable amplification chip according to preprocessing data to realize real-time gain control, and send preprocessing data to a LVDS interface;
   a programmable switch, used to control opening or closure of ant channel in the transducer array to realize sparsification of 3D acoustic imaging transducer array;
   an amplifying filter chip, used to receive and collect analog signals for amplification and filtering;
   a programmable amplifying chip, used for real-time gain and amplification of analog signal data as received according to control signals from the first FPGA chip;
   an AD chip, used to convert analog signals as processed into digital signal data to obtain preprocessing data, and send preprocessing data to the first FPGA chip; and
   the LVDS interface, used to send preprocessing data in the first FPGA chip to signal interaction subsystem;
   wherein the signal interaction subsystem comprises:
   a command interface for the signal interaction subsystem, used to receive commands from embedded GPU signal processing subsystem, and send them to a second FPGA chip;
   multi LVDS interfaces, used to the second FPGA chip for synchronous receiving of preprocessing data from numerous signal acquisition subsystems;
   the second FPGA chip, used to control the multi LVDS interfaces for receiving of preprocessing data as well as synchronous buffering, sorting and packing of preprocessing data according to commands from signal acquisition subsystem; furthermore, it aims to transmit preprocessing data to PCIe bus according to commands from embedded GPU signal processing system; and
   a first PCIe bus, used to send preprocessing data received by the second FPGA chip to the embedded GPU signal processing system;
   wherein the embedded GPU signal processing subsystem comprises:
   a command interface for the embedded GPU signal processing subsystem, used to receive commands from the embedded GPU signal processing subsystem, and send them to the signal interaction subsystem and the signal acquisition subsystem;
   a second PCIe bus, used to receive preprocessing data from signal interaction subsystem, and send the preprocessing data to Tegra K1 embedded GPU processor; the second PCIe bus can realize the maximum data transmission rate of 20 Gbps to satisfy transmission bandwidth for 3D sonar preprocessing data;
   a Tegra K1 embedded GPU processor, used to control data received by the second PCIe bus, and calculate preprocessing data as received to obtain image data, and control remote transmission of image data by Gigabit Ethernet chip, optical fiber transceiver as well as display of image data via a DSI display interface;
   a transmission interface, used to control transmission of sonic wave in certain time sequence;
   a Gigabit Ethernet chip and Gigabit Ethernet interface, used to realize remote transmission of image data;
   a Gigabit transceiver chip and port, used to realize remote transmission of image data via the optical fiber;
   the DSI display interface, used to transmit image data to the display screen for display of 3D data; and
   a debugging interface, used to receive external command for debugging of embedded GPU signal processing subsystem.

* * * * *